March 2, 1971 R. J. OSTROSKI 3,567,341
COFFEEMAKER PUMP
Filed May 22, 1969
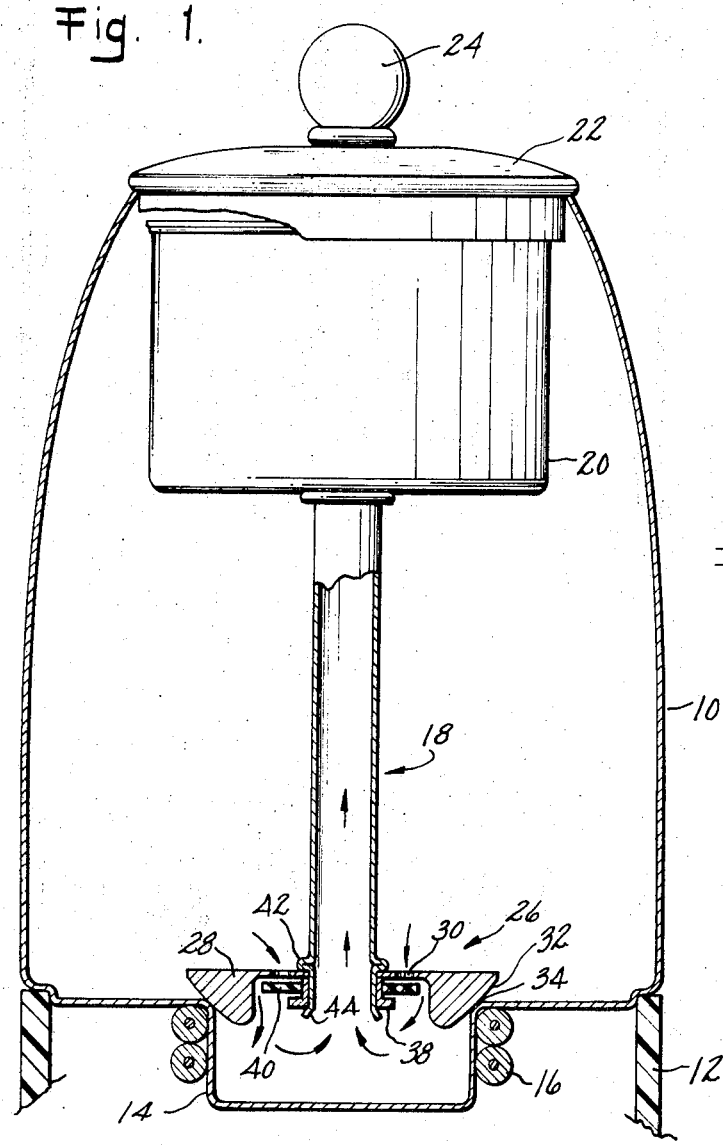
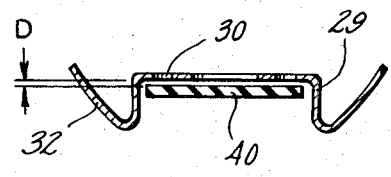
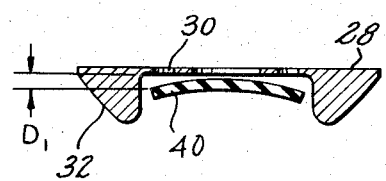
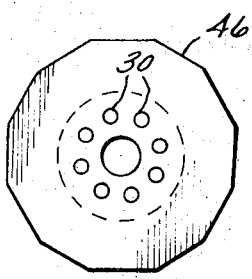
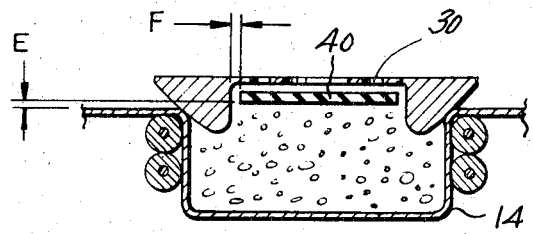
Inventor
Richard J. Ostroski
by John F. Cullen
Attorney

United States Patent Office 3,567,341
Patented Mar. 2, 1971

3,567,341
COFFEEMAKER PUMP
Richard J. Ostroski, Trumbull, Conn., assignor to
General Electric Company
Filed May 22, 1969, Ser. No. 826,986
Int. Cl. F04b 19/24, 1/18
U.S. Cl. 417—209                             7 Claims

ABSTRACT OF THE DISCLOSURE

An electric percolator with improved pump tube valving wherein a conventional flexible washer that controls water admission is combined with a downward cup-shaped member having reverse flared walls for funneling boiling turbulence to produce quick perking and rapid pulsing or pumping.

BACKGROUND OF THE INVENTION

(1) Field of the invention

The invention herein pertains to an electric percolator and, more particularly, to a novel pump assembly valving in the percolator for rapid initial operation and subsequent rapid pulsing with high pump efficiency.

(2) Description of the prior art

Various percolator pumping mechanisms normally have a valving structure containing apertures and a reciprocating washer in the bottom of the percolator to admit water from the container periodically through the valve to be heated in a well where the water boils and then moves up the pump tube to the coffee basket where it drips to form coffee. Pumping is in a pulsing sequence with pressure controlling the valve to close it and lift a slug of water out of the tube to relieve pressure whereupon the valve opens to admit water for another cycle. This results in the visible bubbling of percolators equipped with a glass knob at the top of the tube. The valved structure takes many forms depending on the particular operation that is to be performed. Generally, a thermostat is used to sense the proper time to admit water for additional coffee or to turn the device low or off when the desired brew of coffee has been made. Additionally, the washer controlling water admission may be of non-metallic material such as silicone for quiet operation since the valve is continuously reciprocating in pulses on the pump tube during percolation and this also has the advantage of rapid initial operation because of the low weight of the washer. Further, present designs permit bubbles generated in the heating well during boiling to have access to the top of the washer slowing down the washer reciprocating action to result in inefficient pumping and slower perk cycles. The gap between the reciprocating washer and apertures for water to enter the heating well is a measure of the pulsing or spurting rate which, in turn, is a measure of the speed with which the coffee can be made. In order to prevent percolation until the water temperature is at the desired level, some prior art structures inhibit the passage of water through the pumping structure until it reaches a desired temperature.

SUMMARY OF THE INVENTION

Briefly described, the present invention is directed to an electric percolator which has a container with a heating well in the bottom and a valved pump tube assembly including a coffee basket. The pump assembly extends into the heating well to control water flow from the container to the well and then to the basket. In this invention the pump assembly valving is improved and comprises a downward cup-shaped member having apertures for admitting water to the well. The cup-shaped member extends down into the well and has reverse flaring walls directed up and out of the well with the outer surface of the walls preferably being formed of a spherical surface for contact with the well to form a ball and socket joint for good sealing. The flow controlling washer is made of a material whose resiliency increases with temperature so that, on temperature rise, the washer becomes more resilient and sags or droops. The washer is supported for limited axial reciprocating movement on the pump tube and extends horizontally to the inner edge of the walls of the cup to substantially fill the cup except for a limited space around the washer periphery. The limited axial movement provides a gap between the washer and the cup member to control the apertures and hence water flow. This structure permits quick initial flow since the washer retains its planar shape when cold and admits water to the well for heating. As the water is heated and the temperature increases, pressure in the well forces the washer against the apertures to stop the water entry, and the pressure build-up expels a slug of water from the tube to the basket to relieve pressure, whereupon the washer then opens the apertures to admit the next slug of water from the container for heating. Since the temperature has now increased, the resiliency of the washer increases and the washer droops and the gap opens wider to admit water in greater volume. Rapid pulsing is enhanced by the reverse flaring walls which, in combination with the washer, tend to funnel the bubbles that are generated during boiling to the bottom of the washer to close it rapidly over the apertures. The flow of bubbles around the washer to its top surface, which would slow down its closing, is inhibited because of the funneling structure and the close fitting of the washer in the cup. Thus, the main object of the invention is to provide an improved pump assembly valving for initial rapid perk operation with variable and funneling characteristics to increase the flow on temperature increase for rapid pulsing or percolating.

BRIEF DESCRIPTION OF THE DRAWING

FIG. 1 is a cross-sectional view of a typical percolator structure employing the improved valving structure;

FIG. 2 is a cross-sectional view of the main elements of the valve structure when cold showing a modified sheet metal form;

FIG. 3 shows the structure when hot;

FIG. 4 is a partial sectional view showing the resilient washer in its general environment similar to FIG. 1 illustrating the funnel action, and FIG. 5 is a plan view of the cup member showing the peripheral flats.

DESCRIPTION OF THE PREFERRED EMBODIMENT

Referring first to FIG. 1, there is shown a partial electric percolator with container 10 for holding water in the usual manner on a support base 12 in which the electric control structure, not shown, is housed. To initiate flow, heating occurs in heating well 14 in the bottom, the well being surrounded with wound electric heating coil elements 16 to supply heat directly to the well. The usual valved pump tube assembly generally indicated at 18 is disposed with its lower end, containing a reciprocating water control washer, in well 14 and coffee basket 20 is suitably supported on its upper end to which heated water is cylically admitted. Container 10 has a cover 22 with glass knob 24 to see the perking in the customary manner. The description thus far is directed to conventional and well-known structure.

In order to cycle the water from container 10 through well 14 and up into basket 20 and back into the container as coffee, the tube assembly 18 is provided at its lower end with valving generally indicated at 26 whose function is to control the water flow and cycle it through the coffee. In accordance with the invention, this resilient washer valving structure 26 has been improved for reasons that will become apparent. In accordance with the invention, valving 26 comprises a downward cup-shaped apertured member 28 having a series of apertures 30 in its surface as shown. The cup-shaped member 28 extends into well 14 and is provided around its edge with reverse flared walls 32 that must be directed up and out of the well, i.e., open upwardly and form a joint at 34 with the well as shown.

In order to provide weight and more solidity to the pump structure, the member 28 may be of a solid shape as shown and conveniently formed of sintered metal. Also, the member may be formed sheet metal as shown in FIG. 2. Either form suffices so long as the cup-shape with the reverse flared walls 32 is provided to enter the well and form the joint as described, the cup-shape with the reverse flaring being necessary for bubble control as will become apparent. Preferably the parts, except for the periphery, are cylindrical and flaring walls 32 are formed with a spherical outer mating surface for contact with well 14 so that a ball and socket joint is formed for a good seal even if tube assembly 18 is out of vertical.

An added benefit of the reverse flared walls is a relatively more stable structure if it is desired to stand the entire pump assembly on a flat surface inasmuch as the bottom of the assembly is flat as shown. Member 28 may be supported in place on the pump tube by bushing 38 that has lower flanges to limit movement of control washer 40 which is supportingly mounted for axial movement on the tube. The parts are held in position by any suitable means such as by crimping the tube at 42 and spreading its lower end at 44 to lock bushing 38 and member 28 in place. Water admission is under the control of washer 40 which covers apertures 30 as shown and reciprocates within any suitable limits as set by bushing 38 to alternately open and close apertures 30 and admit water from container 10 to well 14.

In order to reduce the noise of the rapid reciprocation of control washer 40 and to provide for initial immediate pumping, silicone washers have been used which, of course, are of a material whose resiliency increases with temperature and are lighter than the usual metallic washer. The silicone deadens the sound as the washer reciprocates rapidly and its lighter weight allows it to be lifted sooner so there is early evidence of pumping seen by the user thus signalling that the percolator is functioning. This general known structure and operation is improved by the valve structure disclosed herein.

Referring to FIG. 2, the initial position of the valve structure is shown when the water in well 14 is cold and the conventional washer 40 remains flat and planar in a balanced floating position where gap D permits water to enter apertures 30 and flow around the washer and down into well 14 where it is heated. As pressure thus builds, washer 40 is forced up to close apertures 30 after which continual pressure build-up then forces the water in tube 18 out and into basket 20. The subsequent pressure release permits washer 40 to again open the apertures but, being in a heated condition, washer 40 becomes more resilient as the temperature goes up and "softens" so that it droops as shown in FIG. 3 to open larger gap $D_1$ to admit water from container 10 at a much faster rate. Also, because of its resiliency, it conforms easier to any irregularities in the member surface for a good seal. Depending on the temperature of the water, it will be seen that the gap between member 28 and washer 40 is thus a variable gap which allows for rapid unobstructed filling of well 14 depending on the temperature. Thus, when D is small it is more difficult to fill heating well 14 and the result is reduced pump efficiency. This small dimension D is desired initially for early closing of the apertures 30 and immediate pulsing which starts within seconds after energizing heating element 16. The gap thus varies in proportion to temperature to become larger upon temperature increase and this characteristic is important in order to prevent "steaming." This is a phenomenon occurring when well 14 fills slowly and the water that does enter instantly flashes to steam which may become superheated and build up pressure to punch a hole through the water in tube 18 thereby venting the well 14 to stop pumping action. Thus, it is important that well 14 be filled quickly and the generally known drooping characteristics of a flexible washer 40 assures rapid filling by increasing the gap D as temperature increases. The variable gap feature also permits the percolator to be initially started with warm to hot water. A washer fulfilling these conditions of flexibility may be of nylon, silicone rubber, vinyl copolymers, and the rubber family.

It is also very important that this resilient type of washer 40 be free to move for efficient and rapid pump operation. To this end, in accordance with the invention, it is important that no bubbles from the turbulent boiling in the well be able to interfere with the washer movement by lodging between the member 30 and the washer 40 to interfere with the upward movement of the washer in closing off apertures 30. Reference to FIG. 4 illustrates this operation. By providing reverse flared walls 32, a smaller cup is formed which is substantially filled by washer 40 except for small annulus F for passage of water from the apertures to the well 14. Consequently, bubbles that are generated by boiling turbulence are funneled to the washer bottom because of the reverse flare of the walls which thus directs the bubbles as shown to concentrate the boiling pressure on the bottom of the washer for rapid closing of the washer over the apertures in each cycle. Because of the smaller cup defined by the reverse flared walls and the filling of the cup by the washer with its small annulus F, the bubbles are effectively prevented from reaching the upper surface of the washer to slow its closing and therefore slow the pump action with the overall result that all boiling pressure is concentrated on the washer bottom for rapid cycling. The tendency to keep the bubbles only on the bottom of the washer is further enhanced by locating the washer so that substantially all its limited movement is above the percolator bottom as shown by E, FIG. 4 to even further protect and isolate stray bubbles and turbulence from lodging between member 30 and washer 40.

An additional feature that may be incorporated in the present design is to make the periphery of flaring walls 32 non-circular so that the pump assembly will not roll when laid on its side after removal from the percolator. This may be achieved in numerous ways such as providing suitable flats 46 on the edge of the periphery of walls 32, as shown in FIG. 5 any number of flats sufficing e.g. a polygonal periphery is an example that would keep rolling to a minimum.

Thus, the present design incorporating flexible resilient washer 40 in combination with the downward cup member having the reverse walls 32 to provide the funneling action and inhibit pressure on the top of the washer results in a pump design that initially starts fast; gives essentially perfect sealing against irregular surfaces and thus maintains pressure at all times when sealed; that provides rapid and efficient pump operation or pulsing with the variable gap for good percolating at high efficiency without steaming; all the advantages being obtained whether the percolator is started with hot or cold water. These improvements all result in better brewing of the coffee.

While there has been described preferred forms of the invention, obvious equivalent variations are possible in light of the above teachings. It is therefore to be understood that within the definition of the appended claims the invention may be practiced otherwise than as specifically described and the claims are intended to cover such equivalent variations.

What is claimed is:

1. In an electric percolator having a container with a heating well in the bottom and a valved pump tube assembly and basket, the pump assembly in said well controlling water flow from the container to the well and basket, the improvement in the pump assembly valving comprising:
   a downward cup-shaped apertured member supported on said tube and extending into the well, said member having reverse flaring walls directed out of the well and forming a joint therewith,
   washer means of a material whose resiliency increases with temperature horizontally extending in and substantially filling said cup and supported for limited axial movement on said tube to provide a gap between the washer and member and control the apertures,
   whereby the cold washer admits water to the well for heating and, on temperature increase, droops to variable open said gap, and the boiling turbulence in said well is funneled to the bottom of and closes said washer over the apertures during a cycle.

2. Apparatus as described in claim 1 wherein the well, member, and tube are cylindrical and the flaring walls are formed with a spherical surface for contact with the well to form a ball and socket joint therewith.

3. Apparatus as described in claim 2 wherein substantially all washer movement on said tube is above the bottom of said container.

4. Apparatus as described in claim 2 wherein the periphery of the flaring walls is non-circular.

5. Apparatus as described in claim 3 wherein the periphery of the flaring walls is non-circular.

6. Apparatus as described in claim 4 wherein the non-circular periphery has flat means thereon.

7. Apparatus as described in claim 5 wherein the non-circular periphery has flat means thereon.

References Cited

UNITED STATES PATENTS

| | | | |
|---|---|---|---|
| 1,116,962 | 11/1914 | Wilkinson | 417—209 |
| 1,582,685 | 4/1926 | Pence | 99—283 |
| 2,329,116 | 9/1943 | Heilman | 219—43 |
| 2,953,100 | 9/1960 | Andrews | 417—209 |
| 3,023,691 | 3/1962 | Turner | 99—287 |
| 2,975,723 | 3/1961 | Andrews | 417—209 |
| 3,380,374 | 4/1968 | Lowerre | 99—281 |

CARLTON R. CROYLE, Primary Examiner

R. E. GLUCK, Assistant Examiner

U.S. Cl. X.R.

99—312